No. 888,255. PATENTED MAY 19, 1908.
H. G. OSBORNE.
HAND HOLE CLOSURE.
APPLICATION FILED FEB. 11, 1908.

WITNESSES

INVENTOR
Henry G. Osborne
BY
ATTORNEYS

UNITED STATES PATENT OFFICE.

HENRY G. OSBORNE, OF PITTSBURG, PENNSYLVANIA.

HAND-HOLE CLOSURE.

No. 888,255.   Specification of Letters Patent.   Patented May 19, 1908.

Application filed February 11, 1908. Serial No. 415,303.

*To all whom it may concern:*

Be it known that I, HENRY G. OSBORNE, a citizen of the United States, and a resident of Pittsburg, in the county of Allegheny and State of Pennsylvania, have invented a new and Improved Hand-Hole Closure, of which the following is a full, clear, and exact description.

The invention relates to boilers, and its object is to provide a new and improved hand hole closure, arranged to form an exceedingly tight joint to prevent leakage of water or steam, to allow convenient removal whenever desired for gaining access to the tube to be cleaned, and to prevent displacement of the closure by the pressure of steam.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
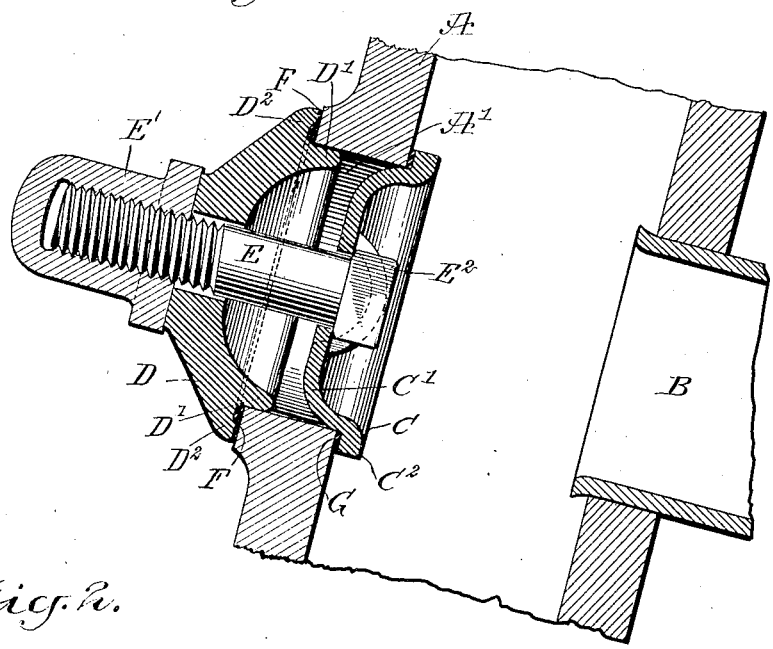
Figure 2:
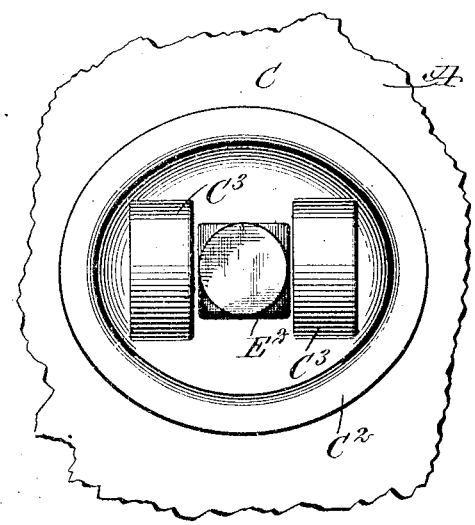
Figure 3:
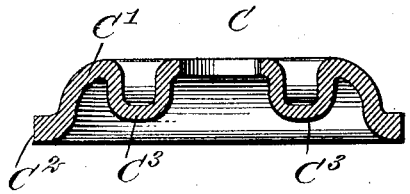

Figure 1 is a sectional side elevation of the improvement as applied; Fig. 2 is an inner face view of the same, and Fig. 3 is a transverse section of the inner or clamping plate.
The hand hole closure as shown in Fig. 1, serves to close the hand hole A' in the boiler plate A opposite the tube B, and the said closure consists essentially of an inner or a clamping plate C, an outer or a covering plate D, and a bolt E centrally connecting the closure plates C and D with each other.

The outer or covering plate D is provided on its inner face with an annular flange D', fitting the wall of the hand hole A', the said flange D' being spaced from the margin of the plate D, thus leaving an annular shoulder or flange $D^2$, which rests on a gasket F, held on the outer face of the boiler plate A. The nut E' of the bolt E, screws against the outer face of the covering plate D, to press the shoulder $D^2$ thereof in firm contact with the gasket F, thus producing a very tight joint between the boiler plate A and the covering plate D.
The inner or clamping plate C is in dish form, having an annular offset C', fitting the wall of the hand hole A', and this offset is spaced from the margin of the plate C, thus leaving an annular flange or shoulder $C^2$, which rests on a gasket G, held on the inner face of the boiler plate A. Now when the nut E' is screwed up, the inner or clamping plate C is thrown outwardly and its flange $C^2$ presses the gasket G, thus forming a tight joint between the clamping plate C and the boiler plate A. The offset C' of the inner of clamping plate C is provided with lugs $C^3$, extending on opposite sides of the head $E^2$ of the bolt E, thus holding the bolt E against turning when its nut E' is screwed up or unscrewed, as will be readily understood by reference to Fig. 2.

From the foregoing it will be seen that by the use of the closure shown and described, the hand hole A' is securely closed to prevent leakage, and the plates C and D are not liable to be displaced by pressure of steam, as the flange D' and the offset C' prevent lateral movement of the plates.

The hand hole closure is very simple and durable in construction, can be readily applied and manufactured at a comparatively low cost.

Having thus described my invention, I claim as new and desire to secure by Letters Patent:

1. A hand hole closure, comprising an inner plate, an outer plate, and a bolt for connecting the plates with each other, the outer plate having on its inner face an annular flange fitting within the hand hole, the flange being spaced from the margin of the outer plate to form an annular shoulder engaging the outer face of the boiler plate, the inner plate being dished to form an off-set for engagement with the inner wall of the hand hole, and an annular shoulder for engagement with the face of the boiler, the dished portion having integral outwardly extending off-sets on opposite sides of its center to form retaining lugs for engagement with the bolt head to hold the bolt against turning.

2. A hand hole closure, comprising an inner plate, an outer plate, and a bolt for connecting the plates with each other, the outer plate having on its inner face an annular flange fitting within the hand hole, the flange being spaced from the margin of the outer plate to form an annular shoulder for engaging the outer face of the boiler plate, the inner plate being dished to form an off-set for engagement with the inner wall of the hand hole, and an annular shoulder for engagement with the face of the boiler.

In testimony whereof I have signed my name to this specification in the presence of two subscribing witnesses.

HENRY G. OSBORNE.

Witnesses:
MELVILLE T. OSBORNE,
E. J. OSBORNE.